US012722962B2

(12) United States Patent
Chen et al.

(10) Patent No.: US 12,722,962 B2
(45) Date of Patent: Sep. 1, 2026

(54) CAN OPENER AND CONTROL METHOD THEREOF

(71) Applicant: ZHUHAI HENGQIN XINRUN INTELLIGENT MANUFACTURING CO., LTD., Guangdon (CN)

(72) Inventors: Senyuan Chen, Zhuhai (CN); Haitao Zou, Zhuhai (CN)

(73) Assignee: ZHUHAI HENGQIN XINRUN INTELLIGENT MANUFACTURING CO., LTD., Guangdong (CN)

( * ) Notice: Subject to any disclaimer, the term of this patent is extended or adjusted under 35 U.S.C. 154(b) by 415 days.

(21) Appl. No.: 18/547,640

(22) PCT Filed: Aug. 4, 2022

(86) PCT No.: PCT/CN2022/110200

§ 371 (c)(1),
(2) Date: Aug. 23, 2023

(87) PCT Pub. No.: WO2023/016328

PCT Pub. Date: Feb. 16, 2023

(65) Prior Publication Data

US 2024/0140772 A1 May 2, 2024

(30) Foreign Application Priority Data

Aug. 12, 2021 (CN) ......................... 202110925220.5

(51) Int. Cl.
*B67B 7/00* (2006.01)

(52) U.S. Cl.
CPC ...................................... *B67B 7/38* (2013.01)

(58) Field of Classification Search
CPC .... B67B 7/30; B67B 7/32; B67B 7/34; B67B 7/38; B67B 7/385; B67B 2007/303
(Continued)

(56) References Cited

U.S. PATENT DOCUMENTS 1,795,478 A * 3/1931 Davis ......................... B67B 7/34 30/426
1,986,870 A * 1/1935 West ......................... B67B 7/34 30/427
(Continued)

FOREIGN PATENT DOCUMENTS

CN 85104814 A 12/1986
CN 2303827 Y 1/1999
(Continued)

OTHER PUBLICATIONS

International Search Report for corresponding International Application No. PCT/CN2022/110200.
(Continued)

*Primary Examiner* — Jason Daniel Prone
(74) *Attorney, Agent, or Firm* — Greenblum & Bernstein, P.L.C.

(57) ABSTRACT

A can opener includes a bracket, a pushing wheel, a can opening cutter, and a cutter shaft; the pushing wheel is rotatably provided on the bracket around a central axis thereof; an outer wall of the knife shaft is provided with a first limiting member, the can opening knife is rotatably sleeved on the knife shaft and is located on the first limiting member, a gap is formed between the can opening knife and the bracket; a peripheral wall of the can opening knife is provided with a blade, a peripheral wall of a first end of the can opening knife adjacent to the pushing wheel is further provided with a second limiting member spaced apart from the blade, and a gap is formed between the blade and the pushing wheel.

10 Claims, 4 Drawing Sheets

(58) Field of Classification Search
USPC .................................................... 30/417–427
See application file for complete search history.

(56) References Cited

U.S. PATENT DOCUMENTS

| | | | | | |
|---|---|---|---|---|---|
| 2,311,660 | A * | 2/1943 | Hothersall | B67B 7/34 | 30/426 |
| 2,383,929 | A * | 8/1945 | Landry | B67B 7/36 | 30/422 |
| 2,462,416 | A * | 2/1949 | Nelson | B67B 7/36 | 30/427 |
| 2,628,422 | A * | 2/1953 | Yeomans | B67B 7/34 | 30/417 |
| 2,984,904 | A * | 5/1961 | McLean | B67B 7/34 | 30/426 |
| 3,075,322 | A * | 1/1963 | Uthoff | B67B 7/38 | 30/424 |
| 3,313,023 | A * | 4/1967 | Jepson et al. | B67B 7/38 | 30/417 |
| 3,374,539 | A * | 3/1968 | Briar et al. | B67B 7/38 | 30/424 |
| 3,510,941 | A * | 5/1970 | Fyfe | B67B 7/34 | 30/422 |
| 3,667,120 | A * | 6/1972 | Krist | B67B 7/38 | 30/425 |
| RE27,504 | E * | 10/1972 | Smith | B67B 7/34 | 30/418 |
| 3,698,084 | A * | 10/1972 | Peterson | B67B 7/38 | 30/424 |
| 3,719,991 | A * | 3/1973 | French | B67B 7/34 | 30/422 |
| 3,781,989 | A * | 1/1974 | Swetlitz | B67B 7/38 | 30/417 |
| 3,808,917 | A * | 5/1974 | McLaren, Jr. | B67B 7/38 | 82/47 |
| 3,881,247 | A * | 5/1975 | Niwa | B67B 7/38 | 30/417 |
| 3,983,625 | A * | 10/1976 | McLean | B67B 7/38 | 30/421 |
| 4,028,807 | A * | 6/1977 | DeSisto | B67B 7/38 | 30/419 |
| 4,251,917 | A * | 2/1981 | Peres | B67B 7/38 | 30/421 |
| 4,604,806 | A * | 8/1986 | Pelczynski | B67B 7/385 | 30/417 |
| 4,733,472 | A * | 3/1988 | Belcourt | B67B 7/34 | 30/422 |
| 4,734,986 | A * | 4/1988 | Peters | B67B 7/34 | 30/426 |
| 5,121,546 | A * | 6/1992 | Chong | B67B 7/34 | 30/418 |
| 5,170,565 | A * | 12/1992 | Brisard | B67B 7/38 | 30/421 |
| 5,181,322 | A * | 1/1993 | Koo | B67B 7/34 | 30/421 |
| 5,347,720 | A * | 9/1994 | Pereira | B67B 7/34 | 30/422 |
| 5,367,776 | A * | 11/1994 | Chong | B67B 7/34 | 30/426 |
| 5,692,309 | A * | 12/1997 | Pereira | B67B 7/34 | 30/422 |
| 6,058,613 | A * | 5/2000 | So | B67B 7/34 | 30/418 |
| 6,094,828 | A * | 8/2000 | Chong | B67B 7/34 | 30/422 |
| 6,108,917 | A * | 8/2000 | Bellis | B67B 7/38 | 30/418 |
| 6,158,130 | A | 12/2000 | Chong | | |
| 6,189,221 | B1 * | 2/2001 | Barrow | B67B 7/38 | 30/421 |
| 7,596,874 | B2 * | 10/2009 | Mah | B67B 7/34 | 30/422 |
| 2002/0026719 | A1 * | 3/2002 | Wang | B67B 7/38 | 30/417 |
| 2007/0180712 | A1 | 8/2007 | Mah et al. | | |

FOREIGN PATENT DOCUMENTS

| | | | | |
|---|---|---|---|---|
| CN | 103058110 A | | 4/2013 | |
| CN | 110655021 A | | 1/2020 | |
| CN | 111646408 A | | 9/2020 | |
| CN | 113526430 A | | 10/2021 | |
| CN | 215828319 U | * | 2/2022 | B67B 7/46 |
| TW | 532384 U | | 5/2003 | |
| WO | WO-2023016328 A1 | * | 2/2023 | B67B 7/38 |

OTHER PUBLICATIONS

Written Opinion of the International Searching Authority for corresponding International Application No. PCT/CN2022/110200.

* cited by examiner

CAN OPENER AND CONTROL METHOD THEREOF

CROSS-REFERENCE TO RELATED APPLICATIONS

This application is an U.S. national phase application under 35 U.S.C. § 371 based upon international patent application No. PCT/CN2022/110200, filed on Aug. 4, 2022, which itself claims priority of Chinese Patent Application No. 202110925220.5, filed on Aug. 12, 2021, entitled "CAN OPENER AND CONTROL METHOD THEREOF". The contents of the above identified applications are hereby incorporated herein in their entireties by reference.

TECHNICAL FIELD

The present disclosure relates to the field of can openers, in particular to a can opener and a control method thereof.

BACKGROUND

A can opener is a common household appliance that cuts through a can body of a can to remove a top cover. The can opener commonly on the market uses a can opening knife to cut a side wall of the can body to remove the top cover. Using the can opener to open the can body is prone to wire drawing, resulting in a mouth of the can is less smooth.

SUMMARY

The object of the present disclosure is to provide a can opener and a control method thereof, which can address the disadvantage of a can opener in the prior art that wire drawing is easy to occur when a can body is cut to remove a cover, which results in a less smooth mouth of the cut can.

The technical solutions are as follows.

A can opener includes a bracket, a pushing wheel, a can opening knife, and a knife shaft;

- the pushing wheel is rotatably provided on the bracket around a central axis thereof;
- an outer wall of the knife shaft is provided with a first limiting member, the can opening knife is rotatably sleeved on the knife shaft and is located on the first limiting member, a gap is formed between the can opening knife and the bracket;
- a peripheral wall of the can opening knife is provided with a blade, a peripheral wall of a first end of the can opening knife adjacent to the pushing wheel is further provided with a second limiting member spaced apart from the blade, and a gap is formed between the blade and the pushing wheel.

In one of the embodiments, a first limiting step is formed between the first end of the can opening knife and the blade, a radial length of the first end of the can opening knife is less than a radial length of the blade, and the first limiting step is the second limiting member.

In one of the embodiments, a radial difference between the radial length of the first end of the can opening knife and the radial length of the blade is in a range of 0.05 mm to 0.5 mm.

In one of the embodiments, the can opener is of a rotary structure, the pushing wheel is laterally provided in the bracket, the can opening knife is vertically provided in the bracket, and the can opening knife is provided obliquely relative to a central axis of the bracket.

In one of the embodiments, a second limiting step is formed on the outer wall of the knife shaft facing a radial direction of the knife shaft, and the second limiting step is the first limiting member.

In one of the embodiments, the can opener further includes a rotating support member, the rotating support member includes an inner ring and an outer ring sleeved on the inner ring and capable of rotating relative to the inner ring, the inner ring is sleeved on the knife shaft and located on the first limiting member, and the can opening knife is sleeved on the outer ring.

In one of the embodiments, the rotating support member includes a ball bearing.

In one of the embodiments, the can opener further includes a connecting shaft connected to the pushing wheel, an accommodating cavity configured to accommodate the connecting shaft is formed in the bracket, the accommodating cavity includes a stroke space, the can opener further includes an elastic member accommodated in the accommodating cavity, and the elastic member is sleeved on the connecting shaft.

In one of the embodiments, the can opener further includes a power mechanism provided on the bracket, the power mechanism includes a driving device and a transmission device, an output end of the driving device is connected to an input end of the transmission device, and an output end of the transmission device is connected to the pushing wheel.

A control method of a can opener, including the can opener as described in any one of the above embodiments, the control method of the can opener includes the following steps:

- controlling the can opener to move to a preset position of a can body, at this time, the pushing wheel abutting against a top portion of the can body, and the can opening knife abutting against a side wall of the can body;
- controlling the pushing wheel to rotate around the central axis thereof, the pushing wheel driving the can body to rotate around a central axis thereof during the rotation; and
- during the rotation of the can body, the blade of the can opener pressing into the side wall of the can body to cut to form a cut opening, when the blade cuts to a preset thickness of the side wall of the can body, the second limiting member of the can opener abutting against the side wall of the can body above the cutting opening.

The technical solutions provided by the application has the following advantages and effects.

The can opener can cut the side wall of the can body adjacent to the top cover to form an outer cutting opening through the cooperation of the bracket, the pushing wheel, the can opener and the knife shaft, and the cut top cover is a complete top cover and can be closed on the can body again. In addition, the can opening knife can be supported by the first limiting member, so that the can opening knife is suspended relative to the bracket, so as to avoid friction between the can opening knife and the bracket during rotation, thereby reducing the slipping of the pushing wheel due to excessive friction, and prolonging the service life of the can opener and reducing noise. Through the second limiting member abutting against the upper area of the cutting opening of the can body, the thickness of the blade inserted into the side wall of the can body during the cutting process can be controlled, the blade is effectively prevented from being excessively inserted into the can body, so that the blade effectively prevents the iron wires from being generated at a cutting opening position of the can body during the cutting process, and a gap range between the blade and the pushing wheel can be increased through the second limiting member, and the precision requirement can be reduce.

BRIEF DESCRIPTION OF THE DRAWINGS

The accompanying drawings herein show specific examples of the technical solution of the present disclosure, and form part of the specification with the specific embodiments, which is used to explain the technical solution, principle and effect of the present disclosure.

Unless otherwise specified or otherwise defined, the same reference numerals in different drawings represent the same or similar technical features, and different reference numerals may be used to represent the same or similar technical features.

DESCRIPTION OF REFERENCE NUMERALS

100. Can opener;

1, bracket; 2, pushing wheel; 3, can opening knife; 31, blade; 32, first limiting step; 4, knife shaft; 41, second limiting step; 42, external thread; 5, rotating support member; 51, inner ring; 52, outer ring; 6, connecting shaft; 7, power mechanism; 71, driving device; 72, transmission device; 8, fixing member; 9, elastic member;

200, can body; 210, protrusion.

DETAILED DESCRIPTION OF THE EMBODIMENTS

In order to facilitate understanding of the present disclosure, specific embodiments of the present disclosure will be described more fully below with reference to the accompanying drawings.

Unless otherwise specified or defined, all technical and scientific terms used herein have the same meaning as commonly understood by one of ordinary skill in the art. In the case of combining the actual scene of the technical solution of the present disclosure, all technical and scientific terms used herein may also have meanings corresponding to the purpose of achieving the technical solution of the present disclosure.

Unless otherwise specified or otherwise defined, the terms "first, second . . . " as used herein are used only to distinguish to distinguish the names, and does not represent a specific quantity or order.

Unless otherwise specified or otherwise defined, the term "and/or" includes any and all combinations of one or more of the associated listed items.

It should be noted that when an element is called "fixed to" another element, it can be directly fixed to another element or there may be intermediate elements. When an element is considered to be "connected to" another element, it can be directly connected to another element or intervening elements may also be present. When an element is considered to be "mounted to" another element, it can be directly mounted to another element or intervening elements may also be present. When an element is considered to be "provided on" another element, it can be directly disposed on another element or intervening elements may also be present.

Figure 1:
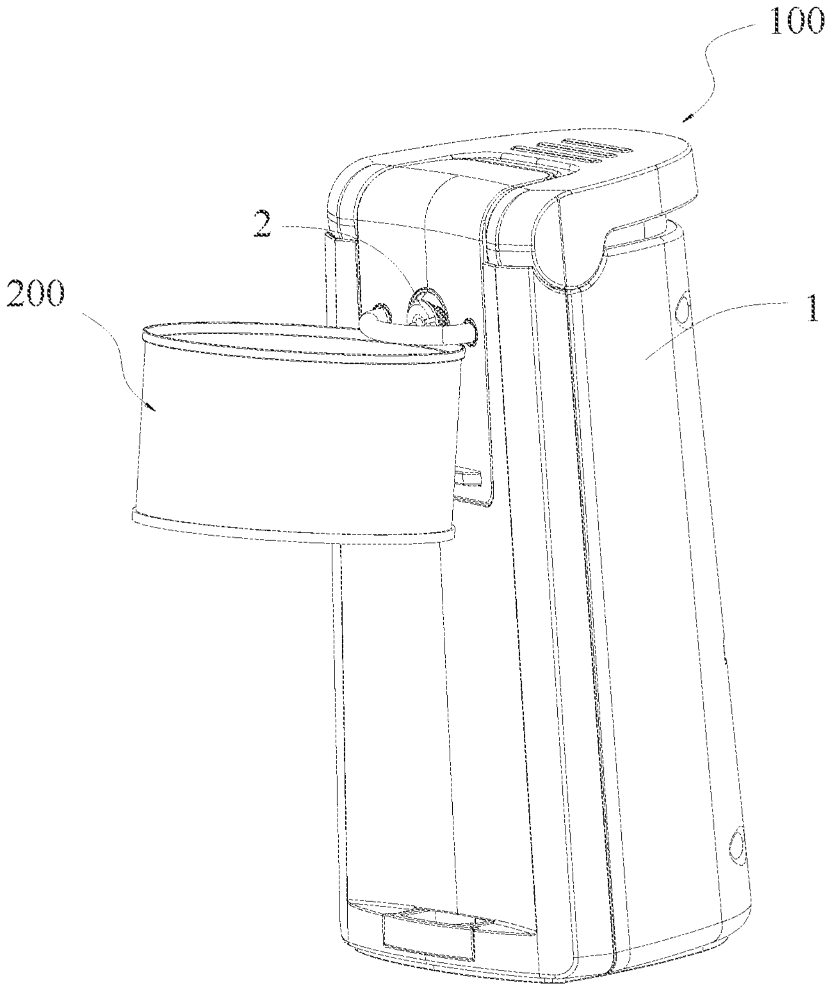
FIG. 1 is a perspective view of a can opener according to an embodiment of the present utility model.

It should be noted that, as shown in FIG. 1, a can opener 100 is capable of cutting a can body 200 to remove a top cover of the can body 200, for example, metal cans or plastic cans may be cut to remove the top cover, which is not specifically limited herein.

The present disclosure provides a can opener 100, as shown in FIGS. 1 to 5. The can opener 100 includes a bracket 1, a pushing wheel 2, a can opening knife 3, and a knife shaft 4. The pushing wheel 2 is rotatably provided on the bracket 1. Specifically in this embodiment, the pushing wheel 2 rotates around a central axis thereof. The pushing wheel 2 is configured to abut against a top portion of the can body 200, and the pushing wheel 2 drives the can body 200 to rotate along with the pushing wheel 2 during rotation.

An outer wall of the knife shaft 4 is provided with a first limiting member, the can opening knife 3 is rotatably sleeved on the knife shaft 4 and is located on the first limiting member. A gap 33 is formed between the can opening knife 3 and the bracket 1. It should be understood that the first limiting member can support the can opening knife 3 to suspend the can opening knife 3 relative to the bracket 1, so as to avoid friction between the can opening knife 3 and the bracket 1 during rotation. Further, the can opening knife 3 is sleeved on the knife shaft 4, on the one hand, it can support the rotation of the can opening knife 3, and on the other hand, it can limit the positional deviation of the can opening knife 3.

A peripheral wall of the can opening knife 3 is provided with a blade 31. A peripheral wall 34 of a first end of the can opening knife 3 adjacent to the pushing wheel 2 is further provided with a second limiting member spaced apart from the blade 31. A gap 35 is formed between the blade 31 and the pushing wheel 2. It should be noted that the first end of the can opening knife 3 is a top end of the can opening knife 3 adjacent to the pushing wheel 2. It should be understood that the gap between the pushing wheel 2 and the blade 31 is configured to clamp a portion between the top cover and a side wall of the can body 200. The pushing wheel 2 is configured to abut against the top portion of the can body 20, and the can opening knife 3 abuts against the side wall of the can body 200 adjacent to the top portion of the can body 200. It should be noted that the can opening knife 3 abuts against a side wall of the can body 200 adjacent to the top cover, and the side wall protrudes outward to form a protrusion 210 with a certain thickness. The pushing wheel 2 drives the can body 200 to rotate along with it during rotation. At this time, the can opening knife 3 cuts the side wall of the can body 200 sequentially to separate the top cover of the can body 200 from the can body 200. In addition, when the pushing wheel 2 abuts against the top portion of the can body 200, the blade 31 of the can opening knife 3 is pressed into the side wall of the can body 200, and the second limiting member is configured to abut against an upper area of the cutting opening formed by the blade 31 cutting the can body 200, so as to control a thickness of the blade 31 inserted into the side wall of the can body 200 during the cutting process, so that the blade 31 effectively prevents the can body 200 from generating iron wires during the cutting process.

It should be understood that the working principle of the can opener 100 is substantially as follows. When it is necessary to open the can body 200, the pushing wheel 2 of the can opener 100 is pressed against the top cover of the can body 200, and the blade 31 of the can opening knife 3 is pressed against the side wall of the can body 200, and the pushing wheel 2 is rotated. At this time, the can body 200 is pushed by the pushing wheel 2 to rotate around a central axis of the can body 200, and the can opening knife 3 rotates along with the can body 200 and the blade 31 located outside the can opening knife 3 is pressed into the side wall of the can body 200 to cut the can body 200. At this time, the second limiting member abuts against the side wall of the can body 200, and the cut top cover is a complete top cover and can be closed on the can body again 200.

In summary, the can opener 100 can cut the side wall of the can body 200 adjacent to the top cover to form the outer cutting opening through the cooperation of the bracket 1, the pushing wheel 2, the can opening knife 3 and the knife shaft 4. The cut top cover is a complete top cover and can be closed on the can body 200 again. In addition, the can opening knife 3 can be supported by the first limiting member, so that the can opening knife 3 is suspended relative to the bracket 1, so as to avoid friction between the can opening knife 3 and the bracket 1 during rotation, thereby preventing the slipping of the pushing wheel 2 due to excessive friction, and prolonging the service life of the can opener 100 and reducing noise. Through the second limiting member abutting against the upper area of the cutting opening of the can body 200, the thickness of the blade 31 inserted into the side wall of the can body 200 during the cutting process can be controlled, the blade 31 is effectively prevented from being excessively inserted into the can body 200, so that the blade 31 can effectively prevent the iron wires from being generated at a cutting opening position of the can body 200 during the cutting process, and a gap range between the blade 31 and the pushing wheel 2 can be increased through the second limiting member, and the precision requirement can be reduce.

Figure 3:
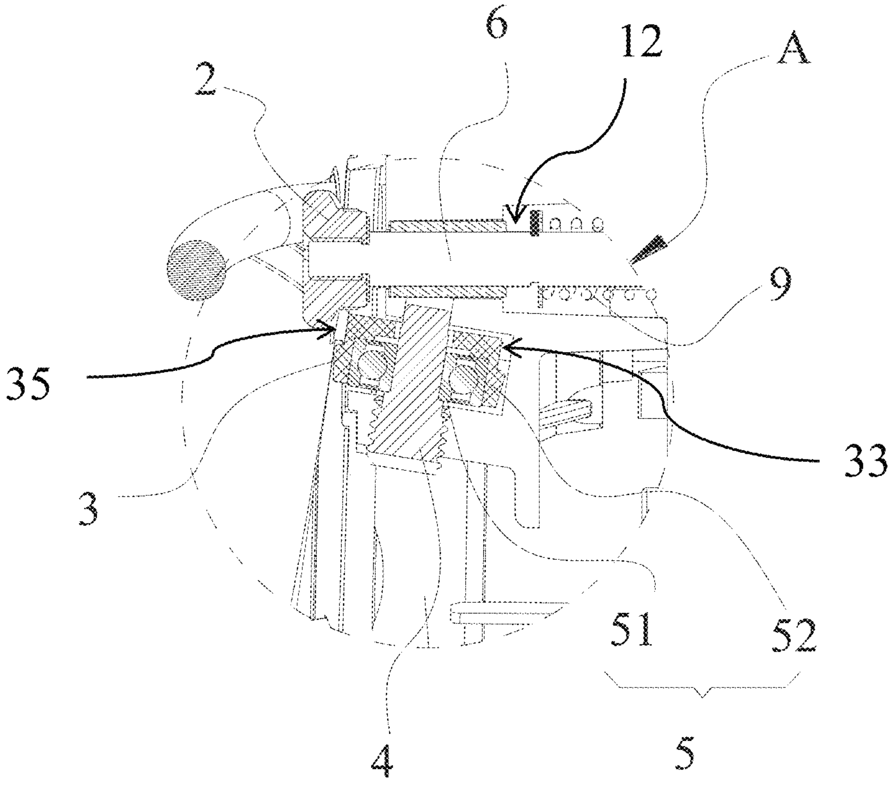
FIG. 3 is an enlarged view of the portion A of the can opener of FIG. 2.
Figure 4:
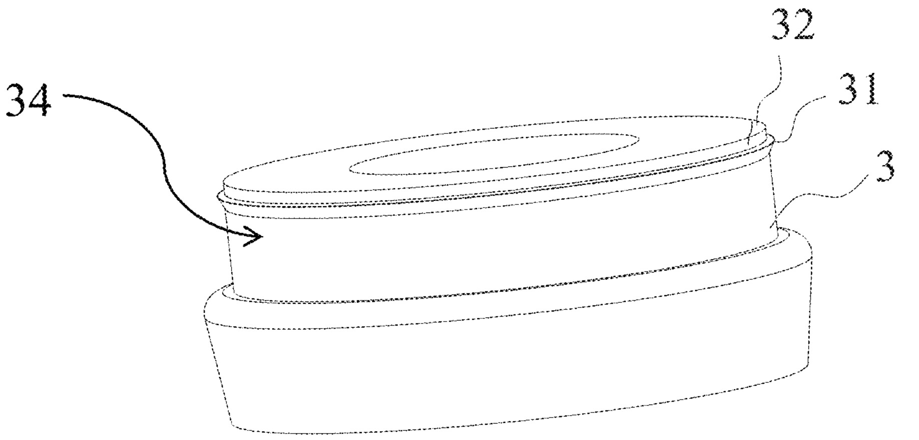
FIG. 4 is a perspective view of a can opening knife of the can opener of FIG. 1.

In some embodiments, as shown in FIGS. 3 and 4, a first limiting step 32 is formed between the first end of the can opening knife 3 and the blade 31, and a radial length of the first end of the can opening knife 3 is less than a radial length of the blade 31. The first limiting step 32 is the second limiting member. It should be understood that by forming the first limiting step 32 retracted inwardly above the blade 31 of the can opening knife 3, when the blade 31 of the can opening knife 3 is pressed into the side wall of the can body 200 to form the cutting opening, the first limiting step 32 can abut against the upper area of the cutting opening formed by the blade 31 cutting the can body 200, so as to control the thickness of the blade 31 inserted into the side wall of the can body 200 during the cutting process, so that the blade 31 can effectively prevent the can body 200 from generating the iron wires during the cutting process.

In some embodiments, as shown in FIG. 4, in order to enable the first limiting step 32 to abut against the upper area of the cutting opening on the one hand, and prevent the first limiting step 32 from hindering the cutting by the blade 31 of the can opening knife 3 on the other hand, and accurately control the thickness of the blade 31 inserted into the side wall of the can body 200 during the cutting process, a radial difference between the radial length of the first end of the can opening knife 3 and the radial length of the blade 31 is controlled to be in a range of 0.05 mm to 0.5 mm. Specifically, the radial difference may be 0.05 mm, 0.2 mm, 0.3 mm, 0.4 mm, 0.5 mm, etc., and is not specifically limited herein.

In some embodiments, the can opening knife 3 is of a rotary structure. The pushing wheel 2 is laterally provided in the bracket 1, the can opening knife 3 is vertically provided in the bracket 1. The can opening knife 3 is provided obliquely relative to a central axis of the bracket 1. Specifically, in this embodiment, a distance from a top end of the knife shaft 4 to the central axis of the bracket 1 is less than a distance from a bottom end of the knife shaft 4 to the central axis of the bracket 1, so that the knife shaft 4 is inclined relative to the central axis of the bracket 1, and the blade 31 of the can opening knife 3 sleeved on a rotating support member 5 forms a certain angle. It should be noted that when the can opener 100 cuts the can body 200, an end of the can opener 100 adjacent to the pushing wheel 2 is inclined toward the can body 200. At this time, the knife shaft 4 is inclined relative to the bracket 1, and it can abut against the side wall of the can body 200, so that the can body 200 can be cut quickly, and the cutting effect and efficiency are further improved. Since the can opening knife 3 forms the rotary structure, the can body 200 can be uniformly cut by the can opening knife 3, the cutting effect is improved, and uneven cutting is effectively avoided. Furthermore, the pushing wheel 2 is of also a rotary structure, so as to be able to push the can body 200 to rotate evenly and improve the cutting effect.

In some embodiments, as shown in FIG. 3, a second limiting step 41 is formed on the outer wall of the knife shaft 4 facing a radial direction of the knife shaft 4, and the second limiting step 41 is the first limiting member. It should be understood that by rotating the can opening knife 3 on the knife shaft 4 and being located on the second limiting step 41, the second limiting step 41 can support the can opening knife 3, so that the can opening knife 3 is mounted at a preset position, and thus the gap can be provided between the can opening knife 3 and the bracket 1.

In some embodiments, as shown in FIG. 3, the can opener 100 further includes the rotating support member 5. The rotating support member 5 includes an inner ring 51 and an outer ring 52 sleeved on the inner ring 51 and capable of rotating relative to the the inner ring 51. The inner ring 51 is sleeved on the knife shaft and located on the first limiting member. It should be noted that the inner ring 51 is fixedly connected to the knife shaft 4, so that the outer ring 52 of the rotating support member 5 can rotate relative to the inner ring 51, and the can opening knife 3 is sleeved on the outer ring 52. It should be understood that the compactness of the overall structure can be improved by sequentially sheathing the knife shaft 4, the inner ring 51, the outer ring 52 and the can opening knife 3. In addition, the outer ring 52 of the rotary support 5 is fixedly connected to the can opening knife 3, and the inner ring 51 of the rotary support 5 is sleeved on the knife shaft 4 and located on the first limiting member, so that the first limiting member can support the rotating support member 5. Therefore, the rotating support member 5 can not only act as a load-bearing structure to support the can opening knife 3, but also can act as a rotating structure to support the rotation of the can opening knife 3, so that the sliding friction during the rotation of the can opening knife 3 can be converted to the rotational friction, which can further reduce the frictional force of the rotation of the can opening knife 3, thereby further reducing the slipping of the pushing wheel 2 due to excessive frictional force, and further prolonging the service life of the can opener 100 and reducing noise.

In some embodiments, the rotating support member 5 includes a ball bearing. It should be understood that the ball bearing has excellent rotation accuracy, which can ensure the smooth rotation of the can opening knife 3 and effectively reduce friction, and can bear relatively large axial and radial loads, so as to form a stable support for the can opening knife 3. It should be noted that, in other embodiments, the rotating support member 5 may also be other bearings or devices that can not only support the can opening knife 3 but also support the rotation of the can opening knife 3, which is not specifically limited herein.

In some embodiments, as shown in FIG. 3, the can opener 100 further includes a connecting shaft 6 connected to the pushing wheel 2. An accommodating cavity 12 configured to accommodate the connecting shaft 6 is formed in the bracket 1, and the accommodating cavity 12 includes a stroke space. The can opener 100 further includes an elastic member 9 accommodated in the accommodating cavity 12, and the elastic member 9 is sleeved on the connecting shaft 6. It should be understood that the accommodating cavity 12 accommodates the connecting shaft 6, and the pushing wheel 2 connected to the connecting shaft 6 is placed outside the can opener 100, so that the can body 200 can be pressed. The accommodating cavity 12 has the stroke space, through the action of the elastic member 9, the connecting shaft 6 can have a buffer space, so that the pushing wheel 2 can be tightly abutted against the top portion of the can body 200.

Figure 2:
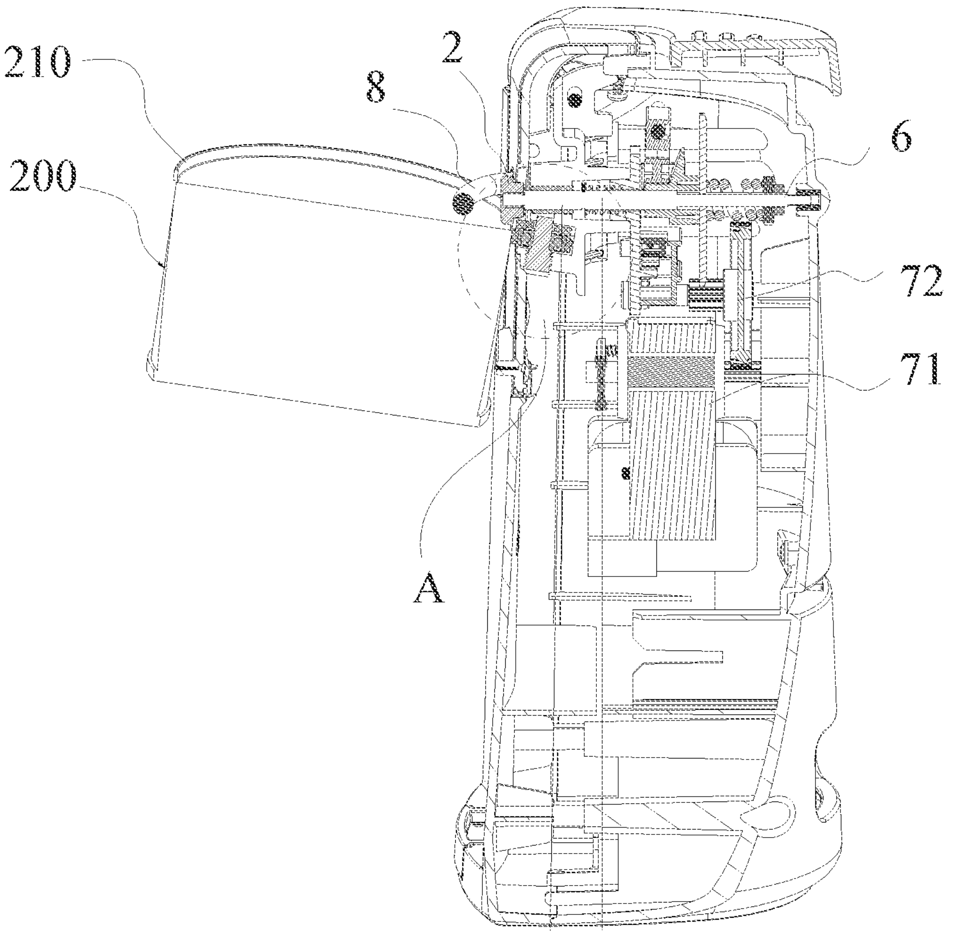
FIG. 2 is a longitudinal cross-sectional view of the can opener of FIG. 1.

In some embodiments, as shown in FIG. 2, the can opener 100 further includes a power mechanism 7 provided on the bracket 1, and an output end of the power mechanism 7 is connected to the pushing wheel 2. It should be understood that the power mechanism 7 automatically drives the pushing wheel 2 to rotate, so that the can opener 100 can be automatically opened, and the can opener 100 can be opened without manual rotation of the pushing wheel 2, thereby improving the automaticity of the can opener 100, and further improving the efficiency and convenience of opening cans.

In some embodiments, the power mechanism 7 includes a driving device 71 and a transmission device 72. An output end of the driving device 71 is connected to an input end of the transmission device 72, and an output end of the transmission device 72 is connected to the pushing wheel 2. Specifically, in this embodiment, the driving device 71 may be a rotating motor. Certainly, in other embodiments, the driving device 71 may be other devices capable of driving the pushing wheel 2 to rotate, which is not specifically limited herein. It should be understood that the driving device 71 drives the transmission device 72 to rotate, and the transmission device 72 drives the pushing wheel 2 to rotate, which can improve the compactness of the structure, so that the driving device 71 that is not coaxial with the pushing wheel 2 can smoothly drive the pushing wheel 2 to rotate.

In some embodiments, as shown in FIG. 2, the transmission device 72 includes a driving wheel and a driven wheel engaged with the driving wheel. An input end of the driving wheel is connected to the output end of the driving device 71, and an output end of the driven wheel is connected to the driving wheel 2. It should be understood that the driving wheel and the driven wheel cooperate to form a gear transmission device, which can transmit the driving force of the driving device 71 to the pushing wheel 2, thereby driving the pushing wheel 2 to rotate smoothly, and has the advantages of compact structure, high working stability, and high transmission efficiency.

In some embodiments, the bracket 1 is provided with a push switch (not shown), the push switch is electrically connected to the driving device 71, and the push switch is configured to control a rotation state of the driving device 71. When it is necessary to open the can, the can opener 100 can be put into a working state by pressing the push switch, and the operation is simple and convenient.

Figure 5:
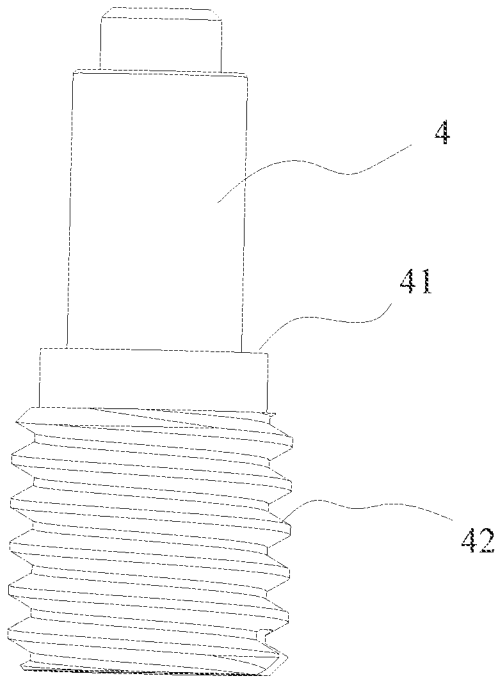
FIG. 5 is a perspective view of a knife shaft of the can opener of FIG. 1.

In some embodiments, as shown in FIG. 5, the outer wall of the knife shaft 4 is provided with an external thread 42, the bracket 1 is provided with an internal thread, and the knife shaft 4 is threadedly connected into the bracket 1 through the external thread 42 and the internal thread. It should be understood that the knife shaft 4 is threadedly connected to the bracket 1, and a position of the knife shaft 4 in the bracket 1 can be adjusted according to actual needs during the assembly process, so that the gap between the can opening knife 3 and the pushing wheel 2 can be adjusted, so as to adapt to the can bodies 200 of different specifications and shapes.

In some embodiments, as shown in FIG. 2, the can opener 100 further includes a fixing member 8 provided on the bracket 1 and adjacent to the pushing wheel 2. The fixing member 8 is configured to support the top cover of the can body 200 when the pushing wheel 2 supports the top cover of the can body 200, so as to effectively avoid the cutting position deviation caused by the position deviation of the can body 200 during the rotation process. Specifically, in this embodiment, the fixing member 8 and the pushing wheel 2 are located at the same position of the bracket 1, and the fixing member 8 is of a ring-shape structure, and the pushing wheel 2 is located in the ring-shape structure.

In some embodiments, as shown in FIG. 2, the bracket 1 has the accommodating cavity 12 and an opening in communication with the accommodating cavity 12. It should be noted that, in this embodiment, the opening is provided on the side wall of the bracket 1. The knife shaft 4 is laterally accommodated in the accommodating cavity 12, the can opening knife 3 is vertically accommodated in the accommodating cavity 12, and a part of the blade 31 of the can opening knife 3 is placed outside the opening. The space is provided between the can opening knife 3 and the cavity wall of the accommodating cavity 12, so as to prevent the can opening knife 3 from contacting the cavity wall of the accommodating cavity 12, thereby preventing the can opening knife 3 from generating relative friction with the bracket 1 during the cutting process, and facilitating the edge of the can opening knife 3 to be pressed into the side wall of the can body 200 to cut the can body 200.

In some embodiments, a peripheral wall of the can opening knife 3 adjacent to the second end is further provided with a third step extending along the radial direction of the can opening knife 3. The third step is spaced apart from the blade 31, and a radial length of the third step is greater than the radial length of the blade 31. When the blade 31 of the can opening knife 3 cuts the side wall of the can body 200, the can opening knife 3 is inclined relative to the can body 200, and the radial length of the third step is greater than that of the radial length of the blade 31, so that when the blade 31 abuts against the side wall of the can body 20, the third step also abuts against the side wall of the can body 200, so as to form a fulcrum when the blade 31 cuts.

Based on the above can opener 100, the utility model further provides a can opening knife 3. A peripheral wall of the can opening knife 3 is provided with a blade 31, and the peripheral wall of the can opening knife 3 is also provided with a first limiting member spaced apart from the blade 31.

In summary, the can opening knife 3 can cut the can body 200 through the blade 31, the blade 31 of the can opening knife 3 is pressed into the side wall of the can body 200 to form the cutting opening, and at the same time, the first limiting member abuts against the upper area of the cutting opening formed by the blade 31 cutting the can body 200 to control the thickness of the blade 31 inserted into the side wall of the can body 200 during the cutting process, the blade 31 is effectively prevented from being excessively inserted into the can body 200, so that the blade 31 effectively prevents the iron wires from being generated at the cutting opening position of the can body 200 during the cutting process, and a gap range between the blade 31 and the pushing wheel 2 can be increased through the first limiting member, and the precision requirement can be reduce.

The present disclosure also provides a control method of the can opener 100, including the can opener 100 described in any one of the above embodiments, and the control method of the can opener 100 includes the following steps.

The can opener 100 is controlled to move to a preset position of the can body 200, at this time, the pushing wheel 2 abuts against the top portion of the can body 200, and the can opening knife 3 abuts against the side wall of the can body 200.

The pushing wheel 2 is controlled to rotate around the central axis thereof, and the pushing wheel 2 drives the can body 200 to rotate around the central axis thereof during the rotation.

During the rotation of the can body 200, the blade 31 of the can opening knife 3 presses into the side wall of the can body 200 to cut to form a cutting opening. When the blade 31 cuts to a preset thickness of the side wall of the can body 200, the second limiting member of the can opening knife 3 abuts against the side wall of the can body 200 above the cutting opening.

In summary, the control method of the can opener 100 can cut the side wall of the can body 200 adjacent to the top cover to form the outer cutting opening, and the cut top cover is a complete top cover, which can be closed on the can body 200 again. In addition, the can opening knife 3 can be supported by the first limiting member, so that the can opening knife 3 is suspended relative to the bracket 1, so as to avoid friction between the can opening knife 3 and the bracket 1 during rotation, thereby reducing the slipping of the pushing wheel 2 due to excessive friction, and prolonging the service life of the can opener 100 and reducing noise. The can body 200 is cut by the blade 31, while the blade 31 of the can opening knife 3 is pressed into the side wall of the can body 200 to form the cutting opening, the second limiting member abuts against the upper area of the cutting opening of the can body 200, the thickness of the blade 31 inserted into the side wall of the can body 200 during the cutting process can be controlled, the blade 31 is effectively prevented from being excessively inserted into the can body 200, so that the blade 31 effectively prevents the iron wires from being generated at the cutting opening position of the can body 200 during the cutting process, and the gap range between the blade 31 and the pushing wheel 2 can be increased through the second limiting member, and the precision requirement can be reduce.

When using drawings to explain, it is to explain the new features that appear. In order to avoid repeated descriptions of the drawings and the description is not concise enough, the features that have been described in the case of clear expressions will not be described one by one in the drawings.

The purpose of the above embodiments is to reproduce and deduce the technical solution of the present disclosure as an example, and to fully describe the technical solution, purpose and effect of the present disclosure, and to enable the public to understand the present disclosure more thoroughly, comprehensive, and does not limit the scope of protection of the present disclosure.

The above embodiments are not exhaustive enumerations based on the present disclosure, and there may be many other implementation manners not listed here. Any replacements and improvements made on the basis of not violating the concept of the application belong to the protection scope of the application. Any replacement and improvement made on the basis of not violating the concept of the present disclosure are within the protection scope of the present disclosure.

What is claimed is:

1. A can opener, comprising a bracket, a pushing wheel, a can opening knife, and a knife shaft;

wherein the pushing wheel is provided on the bracket and is rotatable around a central axis defined by the pushing wheel;

an outer wall of the knife shaft is provided with a first limiting member, the can opening knife is rotatably sleeved on the knife shaft, the first limiting member is configured to support the can opening knife;

an outer side wall of the can opening knife is provided with a blade, the outer side wall of the can opening knife is further provided with a second limiting member at a first end of the can opening knife adjacent to the pushing wheel, a first gap is formed between the blade and the bracket, and a second gap is formed between the blade and the pushing wheel, the second limiting member is configured to abut against a side wall of a can body when the blade cuts to a preset thickness of the side wall of the can body.

2. The can opener according to claim 1, wherein the second limiting member is a first limiting step, the first limiting step is formed between the first end of the can opening knife and the blade, and a radial length of the first end of the can opening knife is less than a radial length of the blade.

3. The can opener according to claim 2, wherein a radial difference between the radial length of the first end of the can opening knife and the radial length of the blade is in a range of 0.05 mm to 0.5 mm.

4. The can opener according to claim 1, wherein the pushing wheel is laterally provided on the bracket, and the can opening knife is provided obliquely relative to a longitudinal axis of the bracket.

5. The can opener according to claim 1, wherein the first limiting member is a second limiting step and the second limiting step is formed on the outer wall of the knife shaft.

6. The can opener according to claim 1, further comprising a rotating support member, wherein the rotating support member comprises an inner ring and an outer ring sleeved on the inner ring and capable of rotating relative to the inner ring, the inner ring is sleeved on the knife shaft and located on the first limiting member, and the can opening knife is sleeved on the outer ring to allow the first limiting member to support the can opening knife through the rotating support member.

7. The can opener according to claim 6, wherein the rotating support member comprises a ball bearing.

8. The can opener according to claim 1, further comprising a connecting shaft connected to the pushing wheel, wherein an accommodating cavity configured to accommodate the connecting shaft is formed in the bracket, the can opener further comprises an elastic member accommodated in the accommodating cavity, and the elastic member is sleeved on the connecting shaft.

9. The can opener according to claim 1, further comprising a power mechanism provided on the bracket;

wherein the power mechanism comprises a driving device and a transmission device, an output end of the driving device is connected to an input end of the transmission device, and an output end of the transmission device is connected to the pushing wheel.

10. A control method of a can opener, comprising the can opener according to claim 1, and the control method of the can opener comprising the following steps:

controlling the can opener to move until the pushing wheel abutting against a top portion of the can body, and the can opening knife abutting against a side wall of the can body;

controlling the pushing wheel to rotate around the central axis thereof, the pushing wheel driving the can body to rotate around a central axis thereof during the rotation; and during the rotation of the can body, the blade of the can opener pressing into the side wall of the can body to cut to form a cut opening, when the blade cuts to a preset thickness of the side wall of the can body, the second limiting member of the can opener abutting against the side wall of the can body above the cutting opening.

* * * * *